United States Patent [19]

Rizzi

[11] 4,369,491
[45] Jan. 18, 1983

[54] PROTECTIVE CIRCUITRY FOR TRANSISTORIZED D-C/D-C CONVERTER

[75] Inventor: Luigi Rizzi, Milan, Italy

[73] Assignee: Societa Italiana Telecomunicazioni Siemens, Milan, Italy

[21] Appl. No.: 147,285

[22] Filed: May 6, 1980

[30] Foreign Application Priority Data

May 10, 1979 [IT] Italy .............................. 22519 A/79

[51] Int. Cl.³ ........................................... H02H 7/122
[52] U.S. Cl. ........................................ 363/56; 363/49; 363/133
[58] Field of Search ...................... 363/22, 23, 49, 56, 363/97, 98, 133; 331/113 R, 113 A, 114

[56] References Cited

U.S. PATENT DOCUMENTS

| | | | |
|---|---|---|---|
| 2,883,539 | 4/1959 | Bruck et al. | 331/114 |
| 2,922,958 | 1/1960 | Dean | 363/49 X |
| 3,119,058 | 1/1964 | Genuit | 363/49 |
| 3,387,229 | 6/1968 | Corey | 363/133 X |
| 3,458,833 | 7/1969 | Lingle | 363/133 X |
| 4,164,014 | 8/1979 | Crowe et al. | 363/56 X |

Primary Examiner—William M. Shoop
Assistant Examiner—Peter S. Wong
Attorney, Agent, or Firm—Karl F. Ross

[57] ABSTRACT

A d-c/d-c converter has two switching transistors connected in push-pull across respective primary halves of an output transformer working into a full-wave rectifier, these primary halves lying in parallel with the primary of a self-saturating feedback transformer whose secondary is split into halves respectively inserted in the emitter/base circuits of the two transistors. The primary of the feedback transformer is shunted by a protective network which comprises a capacitor in series with a rectifier bridge; the network may also include one or two thyristors fired in response to an excessive collector current drawn by the transistors.

7 Claims, 7 Drawing Figures

PROTECTIVE CIRCUITRY FOR TRANSISTORIZED D-C/D-C CONVERTER

FIELD OF THE INVENTION

My present invention relates to a d-c/d-c converter of the type wherein two switching transistors energized by a direct-current source, constituting a d-c/a-c inverter, are operated in push-pull to conduct alternately in response to unbalance currents traversing the primary winding of a self-saturating feedback transformer which has secondary-winding halves inserted in the respective base/emitter circuits of these transistors.

BACKGROUND OF THE INVENTION

In a conventional converter of this description, the primary of the feedback transformer is connected in series with a resistance across the collector leads of the two switching transistors between which the primary of an output transformer is inserted, the latter primary having a center tap connected to one terminal of the d-c source whose other terminal is connected to the two emitters. The secondary of the output transformer, also split into two halves, works into a full-wave rectifier which includes a shunt capacitance and preferably a series inductance for smoothing purposes. The load connected to this rectifier may also be of a partly capacitive nature. Such a converter has the advantages of high voltage stability with variable loads as well as compactness and high operating efficiency. One drawback, however, resides in its tendency to draw a very large starting current, which could be on the order of five to ten times its steady-state current, on account of the capacitances present downstream of its output transformer. Thus, the switching transistors must be designed to handle such large currents even though that need exists only for a very short time, i.e. in a transient phase following cut-in.

A conventional solution to this problem, designed to eliminate the need for oversize transistors, consists in the temporary insertion of a large series resistance into the supply circuit of the converter. Since the protective resistance must be removed or short-circuited after the cut-in but has to be reinserted upon every interruption of normal operation, this solution requires either the assistance of an operator or a complex switching circuit. Such a circuit may comprise, for example, a transistor which acts as the protective resistance by operating linearly in the transient phase but becoming saturated (or being short-circuited) in the steady-state mode.

OBJECTS OF THE INVENTION

An object of my present invention, therefore, is to provide simple circuitry for limiting the collector current of the switching transistors during start-up of the converter.

A related object is to protect these transistors against overloads possibly occurring in operation, e.g. upon an accidental short-circuiting of the load.

SUMMARY OF THE INVENTION

I have found, in accordance with the present invention, that both these objects can be achieved by the provision of a protective network connected across the primary winding of the feedback transformer to limit the magnitude of the unbalance currents traversing this winding.

Pursuant to a more particular feature of my invention, the protective network comprises an ancillary capacitor chargeable through rectifying means such as a diode bridge, this capacitor being provided with a resistive discharge path so as to have zero charge at the time of cut-in. The capacitor, therefore, forms an effective shunt for the feedback primary in the initial phase of operation, i.e. until it has been charged sufficiently to let the converter operate normally. The smoothing and load capacitances downstream of the output transformer are being charged at the same time so that the buildup of the collector currents occurs gradually and without large-amplitude transients.

A sudden rise in the collector current due to a short-circuited load, for example, would also bring the protective capacitor into play so as to limit the amplitude of the inverter oscillations. For this latter purpose, however, I may also provide short-circuiting means supplementing or replacing the ancillary capacitor in the protective network, the short-circuiting means being advantageously in the form of at least one thyristor or controlled rectifier and being activable in response to an excessive collector current by current-sensing means such as ancillary transformers having primary windings in series with that of the output transformer.

BRIEF DESCRIPTION OF THE DRAWING

The above and other features of the invention will now be described in detail with reference to the accompanying drawing in which.

SPECIFIC DESCRIPTION

Figure 1:
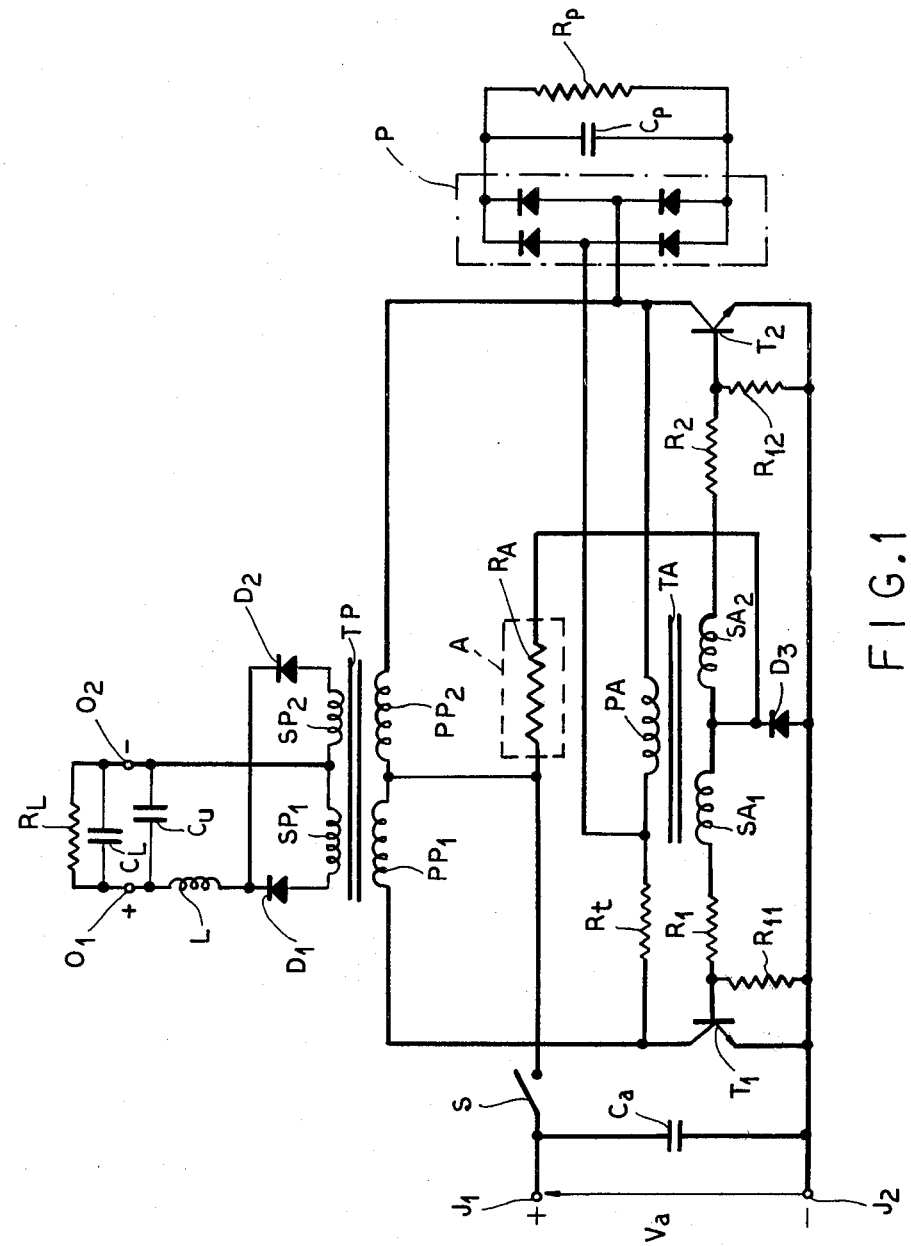
FIG. 1 is a circuit diagram of a transistorized d-c/d-c converter embodying my present improvement.

In FIG. 1 I have shown a d-c/d-c converter comprising a pair of NPN switching transistors $T_1$ and $T_2$ with interconnected emitters and with collectors connected to opposite ends of a split primary $PP_1$, $PP_2$ of an output transformer TP. A preferably stabilized source of direct current, generating a supply voltage $V_a$ of 12 or 24 V, for example, has a positive terminal $J_1$ connected via a switch S to the center tap of transformer winding $PP_1$, $PP_2$ and has a negative terminal $J_2$ (which could be grounded) connected to the emitters of the two switching transistors. The secondary of output transformer TP is split into two halves $SP_1$, $SP_2$ which are connected via respective diodes $D_1$ and $D_2$ as well as a common series inductance L to a positive output terminal $O_1$, the corresponding negative terminal $O_2$ being tied to the junction of winding halves $SP_1$ and $SP_2$. Terminals $O_1$ and $O_2$ are connected across a load here schematically represented by a resistance $R_L$ in parallel with a capacitance $C_L$. Inductance L forms part of a low-pass filter including a smoothing capacitance $C_u$ also bridging the output terminals $O_1$ and $O_2$.

A self-saturating feedback transformer TA has a primary PA connected in series with a resistor $R_t$ across the collectors of transistors $T_1$ and $T_2$: the magnitude of the unsymmetrically disposed resistor $R_t$ may substantially equal that of the inductance of winding PA at the switching frequency of the d-c/a-c inverter constituted by these transistors. The secondary of feedback transformer TA comprises two winding halves $SA_1$ and $SA_2$ respectively connected to the bases of transistors $T_1$ and $T_2$ by way of resistors $R_1$ and $R_2$; other resistors $R_{11}$ and $R_{12}$ connect these bases to the common emitter lead. The junction of winding halves $SA_1$ and $SA_2$ is connected to the center tap of primary $PP_1$, $PP_2$ by way of a start circuit A, here shown to consist simply of a resistor $R_A$, and is further connected to the common emitter lead via the reverse resistance of a diode $D_3$ preventing the flow of direct current bypassing the windings $SA_1$ and $SA_2$. An input capacitor $C_a$ is connected across source terminals $J_1$ and $J_2$.

When the converter so far described is turned on by closure of switch S, the supply current passing from terminal $J_1$ via resistor $R_A$ and the two circuit branches $SA_1$, $R_1$, $R_{11}$ and $SA_2$, $R_2$, $R_{12}$ to terminal $J_2$ is not exactly divided between these imperfectly symmetrical branches so that one of the switching transistors, e.g. $T_1$, becomes more conductive than the other. The difference in the base voltages of the two transistors is intensified by an unbalance current traversing the primary PA as a result of the different collector potentials. Thus, as is well known per se, the collector current drawn by transistor $T_1$ through the associated primary half $PP_1$ progressively increases until feedback transformer TA saturates and causes an increased conductivity of transistor $T_2$ in series with primary half $PP_2$ while the current through transistor $T_1$ diminishes; the switchover between the two transistors continues at a rate determined by the circuit parameters.

Figure 2:
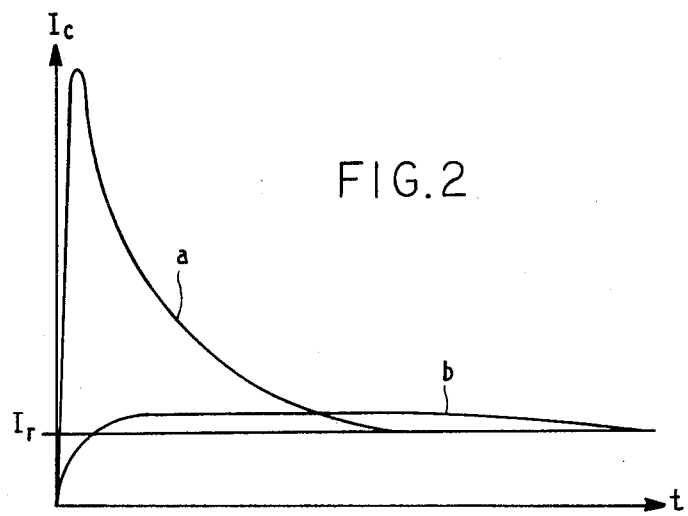
FIGS. 2, 3A and 3B are graphs relating to the operation of the converter shown in FIG. 1.

At the instant of closure of switch S, capacitors $C_u$ and $C_L$ connected across winding halves $SP_1$ and $SP_2$ of output transformer TP are discharged and provide a low-impedance path for current pulses induced in the transformer secondary. Inductance L should not be very large in order to avoid excessive lags in the energization and de-energization of the load; it is, therefore, relatively ineffectual in limiting these current pulses which bypass the load resistance $R_L$ and, in the absence of a protective network as described hereinafter, would give rise to objectionably large collector currents. The envelope of such a collector current $I_c$, plotted against time t, has been represented in FIG. 2 by a curve a with an initial peak rising high above the steady-state level $I_r$.

Figure 3A:
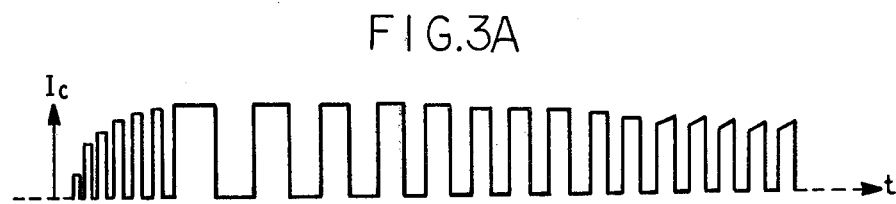
Figure 3B:
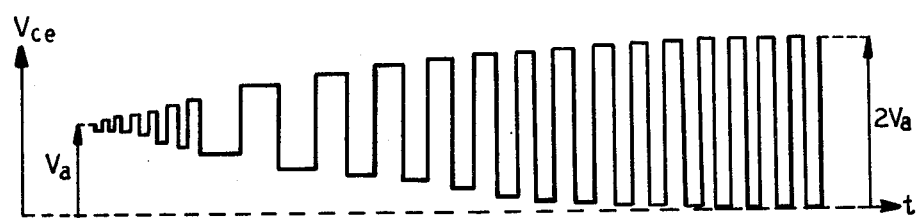

The protective network shown in FIG. 1 comprises a diode bridge P which has its input diagonal connected across primary PA and works into a capacitor $C_p$ in parallel with a discharge resistor $R_p$. The magnitude of resistor $R_p$ should substantially exceed that of the resistor $R_t$ in series with winding PA. At the beginning of operations, with capacitors $C_u$, $C_L$ and $C_p$ all discharged, winding PA is virtually short-circuited by this network so as to minimize the regenerative feedback between the collector current and the base current of the more highly conductive transistor. With suitable dimensioning of capacitor $C_p$, taking into account the gain of transistors $T_1$ and $T_2$, there occurs a more gradual buildup of the collector current as represented by a curve b in FIG. 2, that curve rising but slightly above the normal level $I_r$ before merging into same. The transistors, in fact, operate at this stage on a linear part of their characteristics, well below the saturation point. This has been illustrated in FIG. 3A where the collector current $I_c$ of one transistor is shown to start out as a series of pulses of progressively increasing amplitude and relatively high frequency determined in part by the cross-coupling of winding halves $SA_1$ and $SA_2$ via the core of feedback transformer TA; at an intermediate stage, at which the protective capacitor $C_p$ is substantially fully charged while the output capacitance $C_u$, $C_L$ may still draw a slight current, these pulses reach a maximum amplitude and width before assuming their steady-state configuration. FIG. 3B shows the corresponding changes of the collector/emitter voltage $V_{ce}$ of the same transistor which varies in pulses of similar width about the median value $V_a$ and eventually, in steady-state operation, alternates between $2V_a$ and zero.

Figure 4:
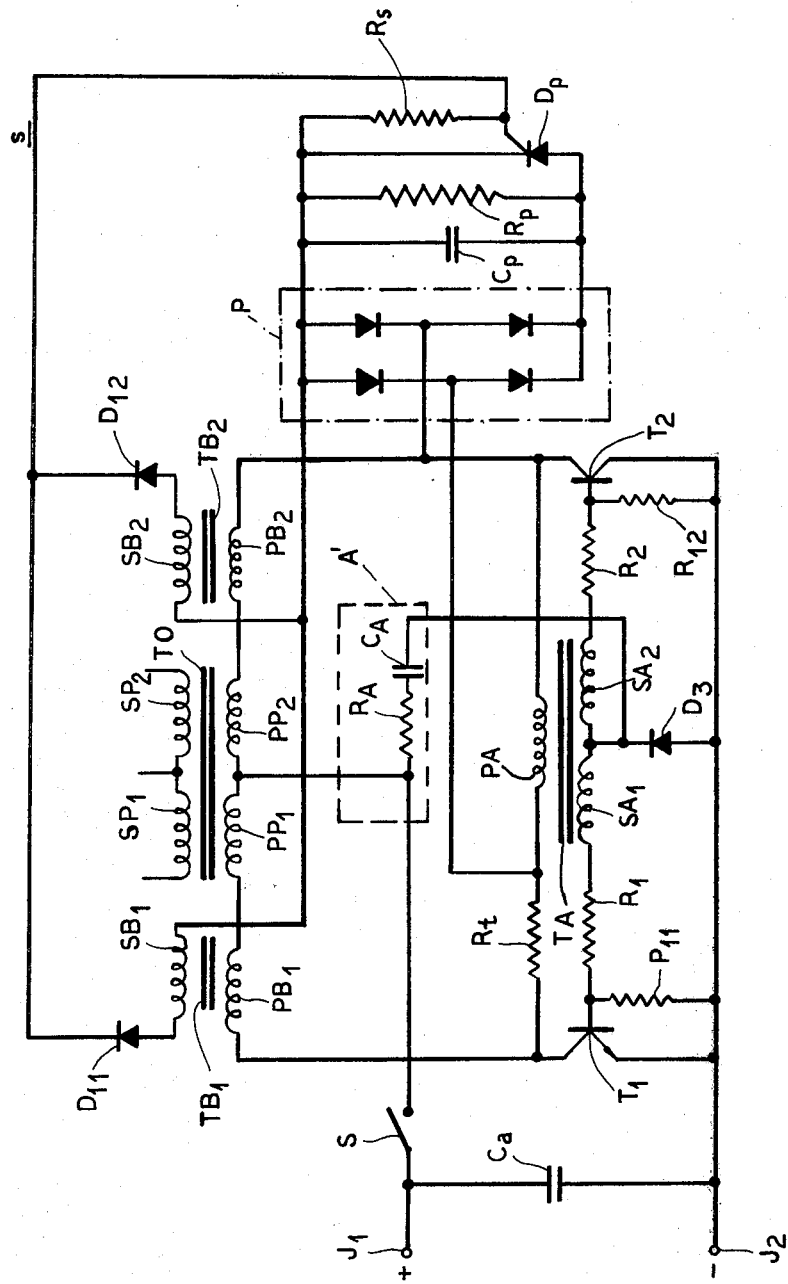
FIGS. 4 and 5 are circuit diagrams representing other embodiments.

In FIG. 4 I have illustrated part of the converter of FIG. 1 together with a modified protective network comprising, in addition to ancillary capacitor $C_p$ and its discharge resistor $R_p$, a thyristor or controlled rectifier $D_p$ having its anode/cathode path connected in parallel therewith across the output diagonal of diode bridge P. The gate of thyristor $D_p$ is connected to its cathode on the one hand through a resistor $R_s$ and on the other hand through a pair of transformer windings $SB_1$ and $SB_2$ in series with respective diodes $D_{11}$ and $D_{12}$. Windings $SB_1$ and $SB_2$ are the secondaries of two ancillary transformers $TB_1$ and $TB_2$ whose primaries $PB_1$ and $PB_2$ are respectively inserted in the collector leads of transistors $T_1$ and $T_2$ to act as current sensors. A positive voltage s delivered by secondaries $SB_1$ and $SB_2$ to the gate of thyristor $D_p$ is proportional to the magnitude of the collector current and serves as a firing signal when that magnitude exceeds a predetermined threshold, thereby effectively short-circuiting the primary PA of feedback transformer TA. When the collector current has abated sufficiently to quench the thyristor $D_p$, normal operation can resume.

The converter of FIG. 4 also comprises a modified start circuit A' including a capacitor $C_A$ in series with resistor $R_A$. This capacitor is designed to prevent the establishment of an anomalous condition in which, with feedback transformer TA virtually deactivated for an extended period as described above, transistors $T_1$ and $T_2$ conduct simultaneously with wasteful dissipation of energy.

Figure 5:
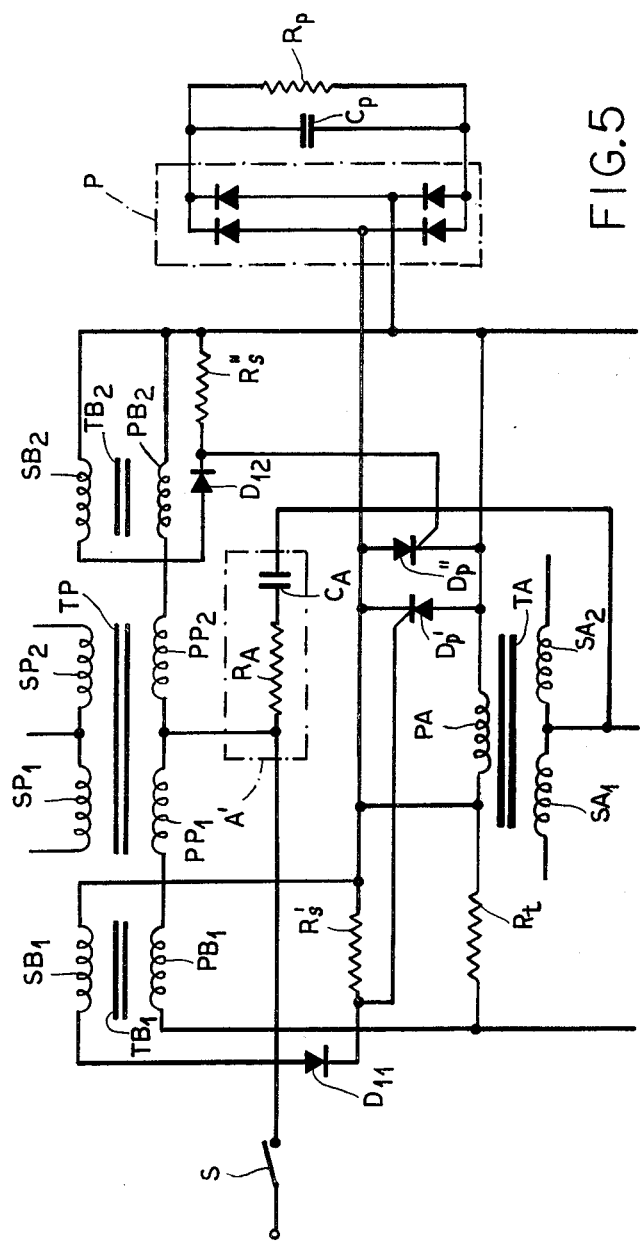

The converter of FIG. 5 differs from that of FIG. 4 in that two thyristors $D_p'$ and $D_p''$ are connected directly and in antiparallel fashion across winding AP, each thyristor being provided with a separate gate resistor $R_s'$ and $R_s''$ respectively connected across the series combination of winding $SB_1$ with diode $D_{11}$ and winding $SB_2$ with diode $D_{12}$. This protective network operates essentially in the same manner as that of FIG. 4.

Figure 6:
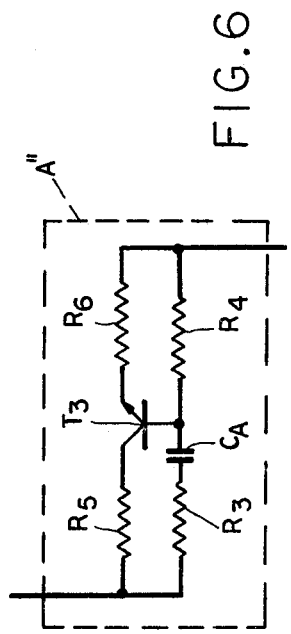
FIG. 6 is a circuit diagram relating to a modification of the two latter embodiments.

FIG. 6 shows a further start circuit A" in which the blocking capacitor $C_A$ lies between two resistors $R_3$, $R_4$ in parallel with an NPN transistor $T_3$ having a collector resistor $R_5$ and an emitter resistor $R_6$; the base of transistor $T_3$ is tied to the junction of capacitor $C_A$ with resistor $R_4$. On start-up, a positive pulse traversing the capacitor $C_A$ turns on the transistor $T_3$ to energize the bases of the switching transistors with a rectangular pulse of sufficient magnitude even when capacitor $C_A$ is of small size. The modified start circuit A" of FIG. 6 could be used in lieu of circuit A' of FIGS. 4 and 5; either of these circuits, designed to insulate the transistor bases from the current supply during steady-state operation, can also be employed in the converter of FIG. 1.

In lieu of breaking the supply circuit at switch S, an operator could apply an external firing signal s to thyristor $D_p$ (FIG. 4) or thyristors $D_p'$, $D_p''$ (FIG. 5) to cut off the converter.

I claim:

1. In a d-c/d-c converter comprising two switching transistors each having an emitter, a base and a collector, a source of direct current having one terminal connected to the emitters of said transistors, an output transformer having a first primary winding inserted between the collectors of said transistors and provided with a center tap connected to another terminal of said source, said output transformer having secondary winding means connected across a full-wave rectifier including a shunt capacitance, and a self-saturating feedback transformer having a second primary winding connected together with a series resistance across said first primary winding, said feedback transformer further having secondary-winding halves inserted in respective base/emitter circuits of said transistors for driving same in push-pull in response to unbalance currents traversing said second primary winding, the combination therewith of a protective network for limiting the magnitude of said unbalance currents upon beginning conduction of said transistors, said network including an ancillary capacitor connected in series with full-wave rectifying diodes and in parallel with a discharge resistor across said second primary winding between a collector of one of said switching transistors and a junction of said second primary winding with said series resistance.

2. The combination defined in claim 1 wherein said protective network further comprises short-circuiting means in parallel with said ancillary capacitor, said transistors being provided with current-sensing means for activating said short-circuiting means in response to an excess collector current.

3. The combination defined in claim 2 wherein said current-sensing means comprises two ancillary transformers having third primary windings in series with said first primary winding and further having secondary winding means connected to said short-circuiting means.

4. The combination defined in claim 3 wherein said short-circuiting means comprises at least one thyristor with a gate-cathode resistance connected across the secondary winding means of said ancillary transformers.

5. The combination defined in claim 1, 2, 3, or 4, further comprising a start circuit inserted between said center tap and a junction of said secondary-winding halves, said start circuit including a blocking capacitor in series with resistance means.

6. The combination defined in claim 5 wherein said start circuit further includes an additional transistor with base/collector circuit connected across said blocking capacitor, said resistance means including a resistor downstream of said blocking capacitor in a base/emitter circuit of said additional transistor.

7. The combination defined in claim 1, 2, 3 or 4 wherein said discharge resistor has a magnitude substantially exceeding that of said series resistance.

* * * * *